United States Patent
Kreuels et al.

(10) Patent No.: US 8,226,169 B2
(45) Date of Patent: Jul. 24, 2012

(54) LOCK FOR A VEHICLE SEAT

(75) Inventors: Olaf Kreuels, Zweibrücken (DE);
Thomas Christoffel,
Herschweiler-Pettersheim (DE)

(73) Assignee: KEIPER GmbH & Co. KG,
Kaiserslautern (DE)

( * ) Notice: Subject to any disclaimer, the term of this patent is extended or adjusted under 35 U.S.C. 154(b) by 338 days.

(21) Appl. No.: 12/524,800

(22) PCT Filed: Mar. 15, 2008

(86) PCT No.: PCT/EP2008/002093
§ 371 (c)(1),
(2), (4) Date: Jul. 28, 2009

(87) PCT Pub. No.: WO2008/119459
PCT Pub. Date: Oct. 9, 2008

(65) Prior Publication Data
US 2010/0102614 A1 Apr. 29, 2010

(30) Foreign Application Priority Data
Mar. 30, 2007 (DE) .................. 10 2007 016 409

(51) Int. Cl.
*B60N 2/20* (2006.01)
(52) U.S. Cl. .................. 297/378.13; 296/65.03
(58) Field of Classification Search .............. 297/336, 297/378.13; 296/65.03
See application file for complete search history.

(56) References Cited

U.S. PATENT DOCUMENTS

| | | | | |
|---|---|---|---|---|
| 4,073,519 A * | 2/1978 | Kurozu et al. | ................ | 292/216 |
| 4,358,141 A * | 11/1982 | Hamada | ................. | 292/216 |
| 4,765,682 A * | 8/1988 | Satoh | ................ | 297/378.13 |
| 5,632,517 A * | 5/1997 | Paulik et al. | ................ | 292/341.12 |
| 5,730,480 A * | 3/1998 | Takamura | ................ | 248/503.1 |
| 6,715,841 B2 * | 4/2004 | Christoffel et al. | ................ | 297/463.1 |
| 6,820,912 B1 * | 11/2004 | Lavoie | ................ | 296/65.03 |
| 7,044,552 B2 * | 5/2006 | Muller et al. | ................ | 297/336 |
| 7,762,605 B2 * | 7/2010 | Otsuka et al. | ................ | 296/65.03 |
| 7,954,898 B2 * | 6/2011 | Van De Geer et al. | ... | 297/378.13 |

FOREIGN PATENT DOCUMENTS

| | | |
|---|---|---|
| DE | 44 39 644 A1 | 6/1995 |
| DE | 101 26 687 A1 | 1/2002 |
| DE | 101 15 667 A1 | 10/2002 |
| DE | 102004018742 | 11/2005 |

* cited by examiner

*Primary Examiner* — Peter R. Brown
(74) *Attorney, Agent, or Firm* — McGlew and Tuttle, P.C.

(57) ABSTRACT

A lock (10) is provided for a vehicle, particularly for a vehicle seat that interacts with a counterelement (B) in the locked state. The lock includes a catch (15) pivotally supported about a first bearing pin (14), having a holder (15a) for the counterelement (B) and a functional surface (15b), and at least one securing element (20, 22) pivotally supported about a second bearing pin (18). The securing element interacts in the locked state, at least intermittently, with the functional surface (15b) in order to secure the locked state of the lock (10). The counterelement (B) approaches the functional surface (15b), the catch (15) having a contact lug (30) that comes into contact with the counterelement (B) approaching the functional surface (15b) before the counterelement (B) can come into contact with the functional surface (15b).

8 Claims, 3 Drawing Sheets

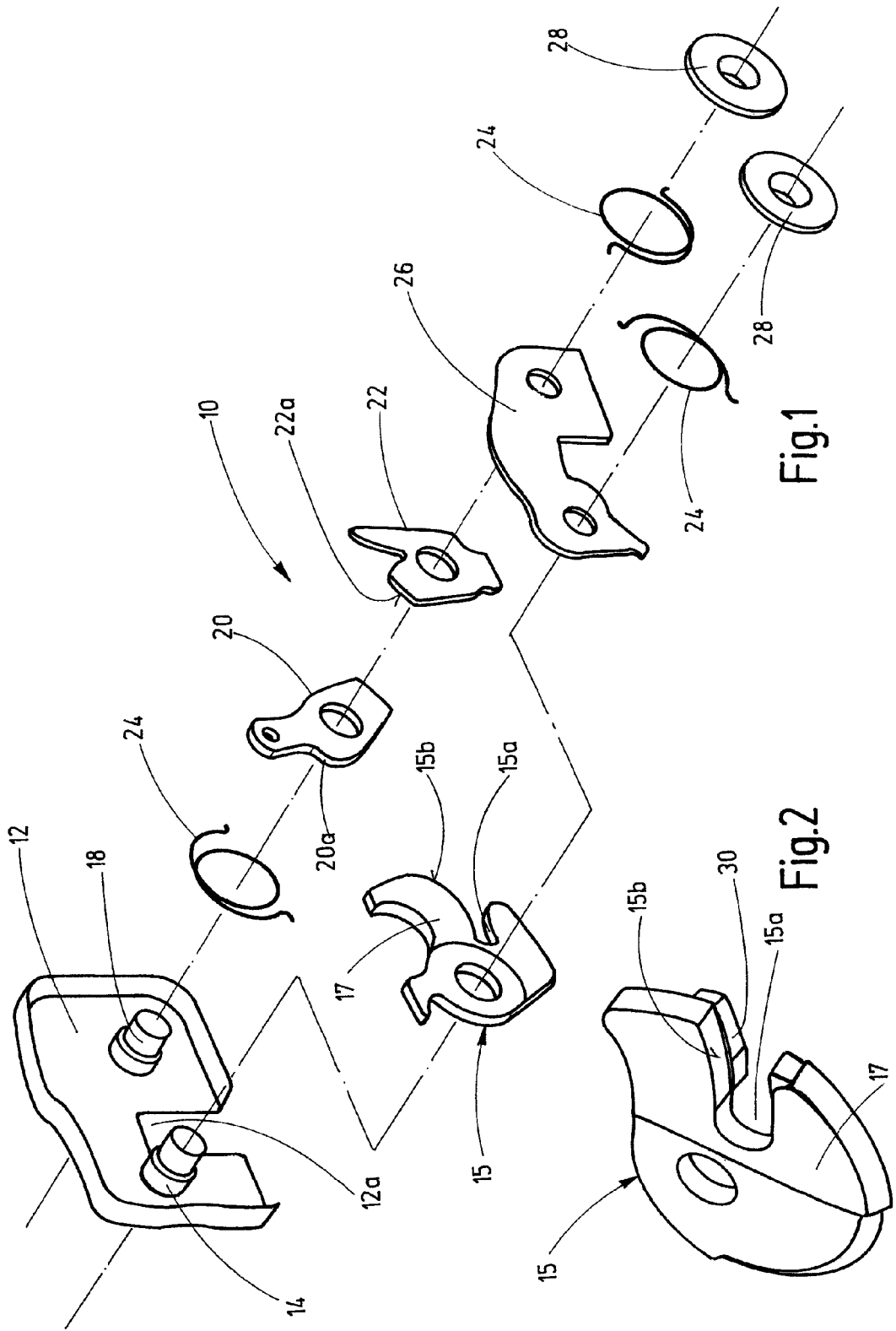

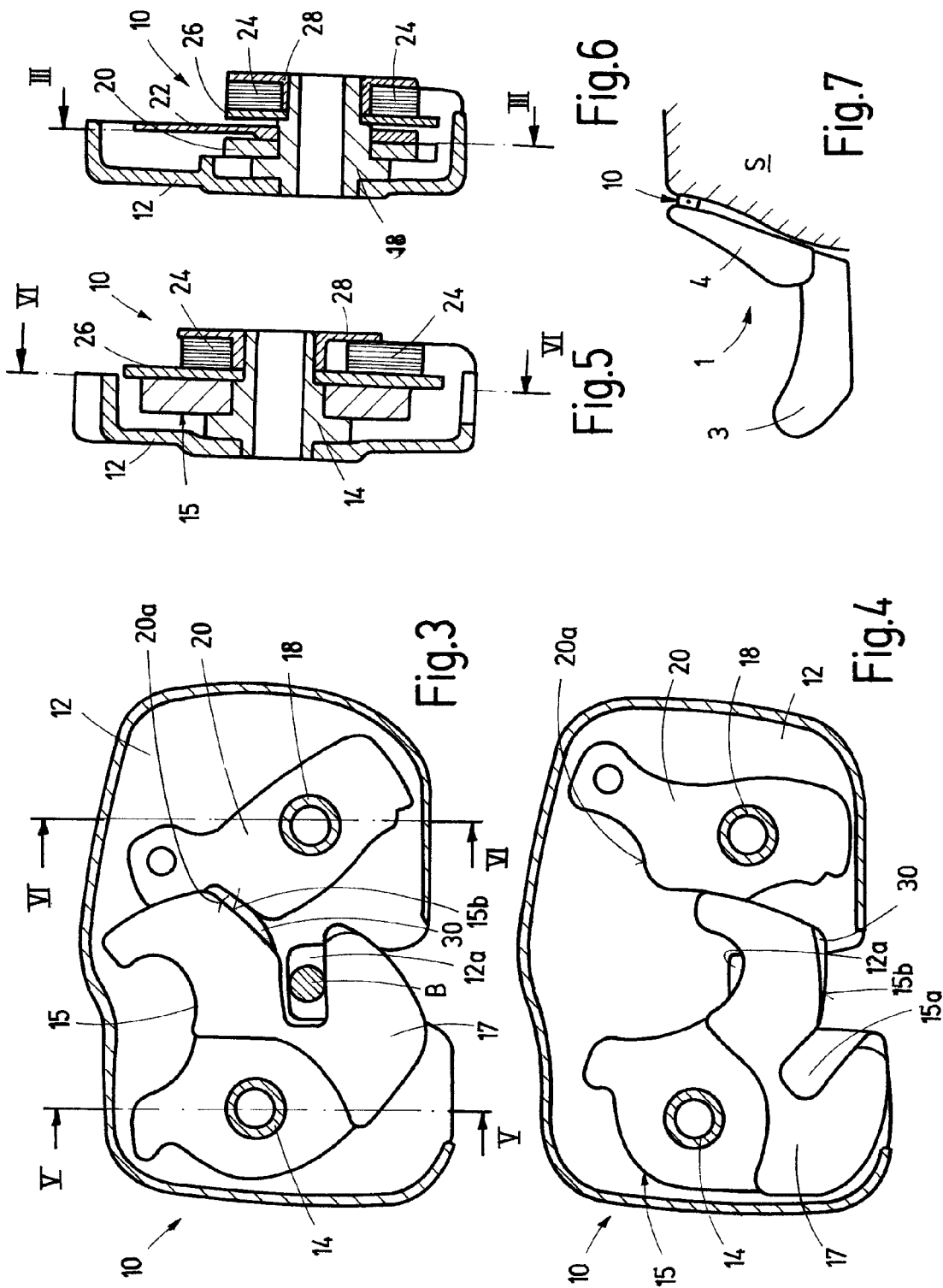

LOCK FOR A VEHICLE SEAT

CROSS REFERENCE TO RELATED APPLICATIONS

This application is a United States National Phase application of International Application PCT/EP2008/002093 and claims the benefit of priority under 35 U.S.C. §119 of German Patent Application DE 10 2007 016 409.4 filed Mar. 30, 2007, the entire contents of which are incorporated herein by reference.

FIELD OF THE INVENTION

The invention relates to a lock for a vehicle seat, the lock in a locked state, interacting with a counter element, the lock having a latch which is mounted pivotably about a first bearing bolt and has a receptacle for the counter element and a functional surface and with at least one securing element which is mounted pivotably about a second bearing bolt and, in the locked state, interacts at least temporarily with the functional surface in order to secure the locked state of the lock.

BACKGROUND OF THE INVENTION

In a lock of this type known from DE 101 15 667 A1, a plurality of components which are movable relative to one another are provided. When tolerances occur or in the event of an impact of such components at a certain relative speed, noises may be produced. It is therefore known through use to provide elastic elements which compensate for tolerances or relative speeds.

SUMMARY OF THE INVENTION

The invention is based on the object of further improving a lock of the type mentioned at the beginning.

A lock for a vehicle and a vehicle seat with the lock are provided. The lock, in a locked state, interacts with a counter element. The lock has a latch which is mounted pivotably about a first bearing bolt and has a receptacle for the counter element and a functional surface. The lock has at least one securing element which is mounted pivotably about a second bearing bolt and, in the locked state, interacts at least temporarily with the functional surface in order to secure the locked state of the lock. During the transfer from an unlocked state into the locked state, the counter element approaches the functional surface, and the latch has a contact lug which comes into contact with the counter element, which is approaching the functional surface, before the counter element can come into contact with the functional surface.

During the transfer from an unlocked state of the lock according to the invention into the locked state, the counter element approaches the functional surface. Since the latch has a contact lug which comes into contact with the counter element, which is approaching the functional surface, before the counter element can come into contact with the functional surface, an impact of the preferably metallic counter element against the preferably metallic functional surface is avoided. A possible formation of noise is therefore reduced. At the same time, the functional surface can continue to be exposed in order, in direct interaction with the securing element or the securing elements, to hold the latch in a manner free from play and to secure the locked state without noise dampers being arranged in the force flux.

The contact lug is preferably arranged directly adjacent to the functional surface and preferably projects in the direction from which the counter element approaches. The contact lug is of as stiff a design as possible in order to continue to prevent contact of the counter element and of the functional surface even after a small—in particular elastic—deformation. Obstruction of the counter element on its path into the receptacle of the latch is avoided by the contact lug not protruding over the functional surface by much ("height") in comparison to the other dimensions of the components. The latch is preferably secured by a catching and clamping system, as described, for example, in DE 44 39 644 A1.

The lock according to the invention is preferably used for a vehicle seat, the backrest of which can be locked to the vehicle structure. However, it may also be used at a different location on the vehicle seat, for example for locking the vehicle seat to the vehicle floor, or at a different location in a vehicle, for example for the locking of doors or engine hoods.

The various features of novelty which characterize the invention are pointed out with particularity in the claims annexed to and forming a part of this disclosure. For a better understanding of the invention, its operating advantages and specific objects attained by its uses, reference is made to the accompanying drawings and descriptive matter in which preferred embodiments of the invention are illustrated.

BRIEF DESCRIPTION OF THE DRAWINGS

In the drawings:

FIG. 1 is an exploded illustration of the exemplary embodiment according to the invention;

FIG. 2 is a perspective view of the latch according to the invention;

FIG. 3 is a section through the exemplary embodiment along line III-III in FIGS. 5 and 6 and shown in the locked state;

FIG. 4 is a section corresponding to FIG. 3 in the unlocked state;

FIG. 5 is a section through the exemplary embodiment along the line V-V in FIG. 3;

FIG. 6 is a section through the exemplary embodiment along the line VI-VI in FIG. 3;

FIG. 7 is a schematic side view of a vehicle seat; and

DESCRIPTION OF THE PREFERRED EMBODIMENTS

Figure 8:
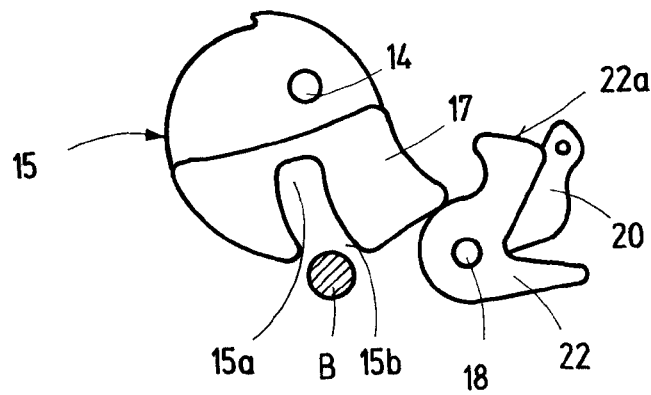
FIG. 8 is a partial view of the exemplary embodiment showing a state during the locking operation.
Figure 9:
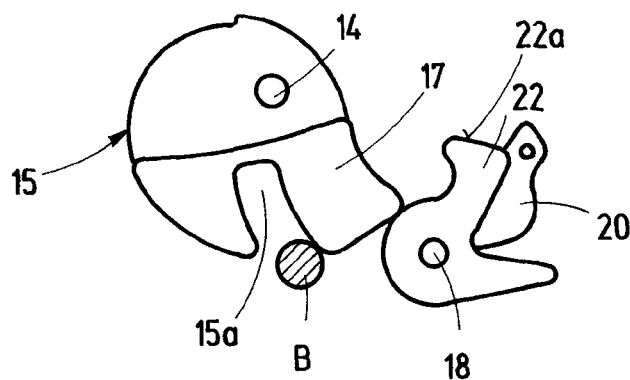
FIG. 9 is a partial view of the exemplary embodiment showing another state during the locking operation.
Figure 10:
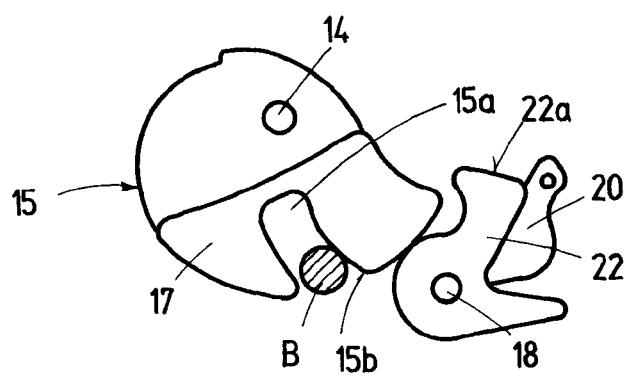
FIG. 10 is a partial view of the exemplary embodiment showing another state during the locking operation.
Figure 11:
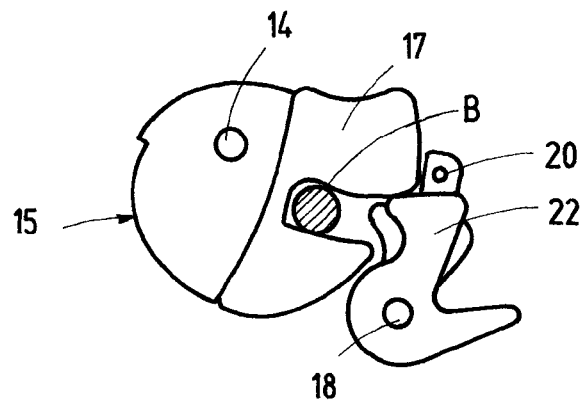
FIG. 11 is a partial view of the exemplary embodiment showing another state during the locking operation.

Referring to the drawings in particular, a vehicle seat 1 is provided in a rear row of seats in a motor vehicle. The vehicle seat 1 has a seat part 3 and a backrest 4 which is pivotable relative to the seat part 3. The backrest 4 can be locked—releasably for the user—to the vehicle structure S of the motor vehicle by means of at least one lock 10 and a counter element B. In this case, the lock 10 can be attached to the backrest 4 and the counter element B to the vehicle structure S, or vice versa. The counter element B is, for example, a bolt or a bar with a round, in particular circular or oval, cross section.

The lock 10 comprises a housing 12 which, in the present case, is of single-part and half-open design, but may also be in two parts and closed. A first bearing bolt 14 protrudes vertically from the housing 12 and, in the present case, is drawn in the form of a projection out of the material of the metallic housing 12. The hollow, first bearing bolt 14 supports a pivotable latch 15. The directional details used below refer to the cylindrical coordinates defined as a result. For interaction with the counter element B, the housing 12 and the latch 15 have a respective receptacle 12a and 15a which intersect each other in a locked state of the lock 10. In an unlocked state of the lock 10, the latch 15 is pivoted in such a manner that its receptacle 15a and the receptacle 12a of the housing 12 are ready to receive the counter element B. The otherwise metallic latch 15 has a cap 17 made of plastic which covers partial regions of the latch 15, in particular the edges of the receptacle 15a. The cap 17 can come into direct contact with the counter element B.

A second bearing bolt 18 which is parallel to the first bearing bolt 14 likewise protrudes vertically from the housing 12 and, in the present case, is likewise drawn in the form of a projection out of the material of the metallic housing 12. The hollow, second bearing bolt 18 supports a catch element 20 and, offset thereto along the second bearing bolt 18, a clamping eccentric 22, said catch element and clamping eccentric both being pivotable independently of each other in the plane of the latch 15. The latch 15, the catch element 20 and the clamping eccentric 22 are each prestressed in a pivoting direction, in the present case by means of springs 24, with the latch 15 being prestressed in its opening direction and the catch element 20 and the clamping eccentric 22 being prestressed in their closing direction. The prestressed clamping eccentric 22 acts in the locked state of the lock 10 by means of a clamping surface 22a, which is curved eccentrically with respect to the second bearing bolt 18, in order to exert a closing moment on the latch 15. A functional surface 15b of the latch 15 interacts with the clamping surface 22a, with the angle between the clamping surface 22a and the functional surface 15a lying outside the self-locking region. The functional surface 15b is formed in that region of the metallic latch 17 which is otherwise covered by the cap 17, but the cap 17 has an aperture at this location in order to permit direct contact with the metallic functional surface 15b.

In the locked state of the lock 10, the catch element 20 is arranged with a catch surface 20a at a distance from the functional surface 15b. If, in the event of a crash, the latch 15 exerts an opening moment on the clamping eccentric 22 by means of the forces occurring between the lock 10 and counter element B and begins to open said clamping eccentric, the latch 15, after a short pivoting distance, comes with its functional surface 15b into contact with the catch surface 20a. The angle between the catch surface 20a and the functional surface 15b lies within the self-locking region, i.e. the latch 15 cannot exert an opening moment on the catch element 20. The catch element 20 therefore supports the latch 15 in the event of a crash. The catch element 20 and the clamping eccentric 22 are therefore securing elements. They are both of metallic design.

To improve the load bearing capacity of the lock 10, in particular in the event of a crash, in the present case a coupling plate 26 is provided, said coupling plate being placed onto the two bearing bolts 14 and 18 and being secured on the bearing bolts 14 and 18 by means of two securing rings 28. The latch 15, the catch element 20 and the clamping eccentric 22 are therefore arranged spatially between the housing 12 and coupling plate 26.

The latch 15 has a contact lug 30 laterally offset from the functional surface 15b, or, more precisely, offset from the functional surface 15b toward the housing 12 in the axial direction with respect to the first bearing bolt 14. The contact lug 30 projects in the circumferential direction, i.e. in the pivoting direction of the latch 15, in relation to the functional surface 15b, in the present case by approximately 0.5 mm. Since, in the present case, the latch 15 bears a cap 17, in particular also in the region surrounding the functional surface 15b, in the present case the contact lug 30 is integrally formed on the cap 17, i.e. is formed as a single piece therewith. The contact lug 30 is therefore composed of plastic. The contact lug 30 could also be a separately formed component which is fastened to the latch 15. The contact lug 30 does not have any particular function in the locked state of the lock 10 and during the unlocking operation.

Starting from an unlocked state of the lock 10, the unlocked lock 10 and the counter element B approach each other during the locking operation, i.e. during the transfer from the unlocked state into the locked state. In the process, the contact lug 30 moves ahead of the functional surface 15b. The contact lug 30 comes into contact with the counter element B. The contact lug 30 absorbs the impact and therefore serves as an impact protection means. The material of the contact lug 30 is deformed as little as possible so that the counter element B does not come into contact with the functional surface 15b. The contact lug 30 therefore prevents formation of noise upon impact of the metallic functional surface 15b and metallic counter element B with each other.

Over the further course of the locking operation, the counter element B—owing to a closing pivoting movement of the latch 15 which is acted upon by the counter element B—then passes from the contact lug 30 into the adjoining receptacle 15a of the latch 15 and to the base of the receptacle 12a of the housing 12. The counter element B is then held between an edge region of the receptacle 15a of the latch 15 and an edge region of the receptacle 12a of the housing 12. The catch element 20 and the clamping eccentric 22—owing to their prestressing—execute a closing pivoting movement toward the latch 15.

The latch 15 is secured in the locked state by the clamping eccentric 22 in normal circumstances and by the catch element 20 in the event of a crash. For the unlocking operation, i.e. the transfer from the locked state into the unlocked state, the catch element 20 is first of all opened, i.e. pivoted away from the functional surface 15b. The clamping eccentric 22 is then carried along by the catch element 20 or the actuating element thereof and is likewise opened. In the present case, the latch 15 opens on account of its prestressing.

While specific embodiments of the invention have been described in detail to illustrate the application of the principles of the invention, it will be understood that the invention may be embodied otherwise without departing from such principles.

The invention claimed is:

1. A lock for a vehicle seat, which lock, in a locked state, interacts with a counter element, the lock comprising:
   a latch mounted pivotably about a first bearing bolt and having a receptacle for the counter element and having a functional surface;
   a securing element mounted pivotably about a second bearing bolt and, in the locked state, interacting at least temporarily with the functional surface in order to secure the locked state of the lock, wherein during the transfer from an unlocked state into the locked state, the counter element approaches the functional surface, and the latch has a contact lug which comes into contact with the counter element, which is approaching the functional surface, before the counter element can come into contact with the functional surface, the contact lug being laterally offset from the functional surface, including being axially offset from the functional surface with respect to the first bearing bolt, the contact lug projecting in relation to the functional surface in a pivoting direction of the closing latch, the contact lug being formed of a more deformable material than a material forming the functional surface, wherein the latch is pivotal between a lock position and an unlock position, the contact lug, the functional surface and the latch receptacle being arranged to have the contact lug first contact the counter element when the latch moves from the unlock position to the lock position, the functional surface and the latch receptacle also being arranged to have the counter element spaced away from the contact lug and the functional surface, and in the latch receptacle when the latch is in the lock position.

2. The lock as claimed in claim 1, wherein the functional surface and the counter element are each of metallic design.

3. The lock as claimed in claim 1, wherein the contact lug is slightly deformed upon contact with the counter element such that contact between the counter element and the functional surface is prevented.

4. The lock as claimed in claim 1, wherein the contact lug is formed from plastic.

5. The lock as claimed in claim 1, wherein the latch has a cap made of plastic, the cap being provided in a region of the receptacle.

6. The lock as claimed in claim 5, wherein the contact lug is integrally formed on the cap.

7. The lock as claimed in claim 1, wherein said securing element comprises a clamping eccentric which normally subjects the latch to a closing moment, on the functional surface, and a catch element which supports the latch in the event of a crash, on the functional surface, the securing elements for securing the locked state of the lock.

8. A lock for a vehicle which interacts with a counter element, the lock comprising:
a housing defining a housing opening;
a latch pivotally mounted on said housing between a lock position and an unlock position, said latch defining a latch opening, said latch having a functional surface, said latch and said housing being arranged to have the counter element fixed in said housing opening and said latch opening when said latch is in said lock position, said latch including a contact lug extending from only a portion of said functional surface, and in a circumferential direction of the pivoting, said contact lug, said functional surface and said latch opening being arranged to have said contact lug first contact the counter element when the counter element enters said housing opening, and said latch moves from said unlock position to said lock position, said functional surface and said latch opening also being arranged to have the counter element spaced away from said contact lug and said functional surface, and in said latch opening, when said latch is in said lock position, said contact lug being formed of a more deformable material than a material forming said functional surface.

* * * * *